United States Patent [19]

Traut

[11] 4,056,292
[45] Nov. 1, 1977

[54] LINEAR ROLLING CONTACT DEVICES

[76] Inventor: Earl W. Traut, 8040 Palm Lake Drive, Orlando, Fla. 32811

[21] Appl. No.: 710,797

[22] Filed: Aug. 2, 1976

[51] Int. Cl.$^2$ .............................................. F16C 23/08
[52] U.S. Cl. .................................... 308/206; 308/200
[58] Field of Search ............... 308/6 R, 6 B, 6 C, 206, 308/200

[56] References Cited

U.S. PATENT DOCUMENTS

| 3,365,254 | 1/1968 | Nasvytis | 308/206 |
| 3,452,175 | 6/1969 | Wilkes | 308/6 R |
| 3,937,536 | 2/1976 | Traut | 308/206 |

Primary Examiner—Robert R. Song
Assistant Examiner—Gene A. Church

[57] ABSTRACT

Linear motion device including bearings and valves in which all elements are in rolling contact only, there being no sliding friction. A pair of major rollers is prevented from moving apart by one or more retaining rings, belts or springs, or; two groups of major rings have a retainer roller inserted through them and in rolling contact with their inner peripheries to prevent them from moving apart. One or two separating rollers are interposed between the major rollers or major rings to prevent them from moving towards each other, the separating rollers being held in position by gravity, retaining rings, or a rigid stationary element. A rod or bar may be inserted between two or more rotating elements so as to move in parallel rolling contact with respect to another bar, stationary base, or housing to provide a linear bearing. One embodiment of the device is operable within a close-fitting housing to serve as a linear fluid actuated valve.

12 Claims, 23 Drawing Figures

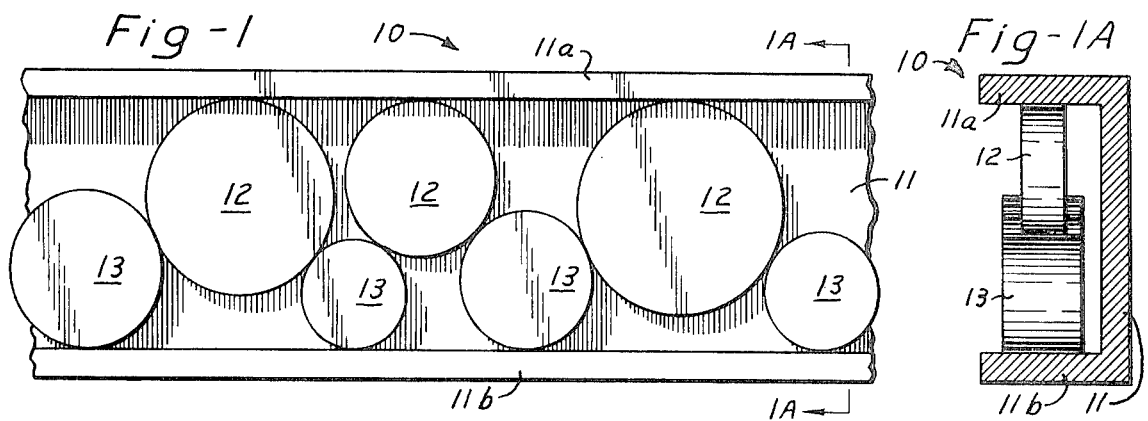
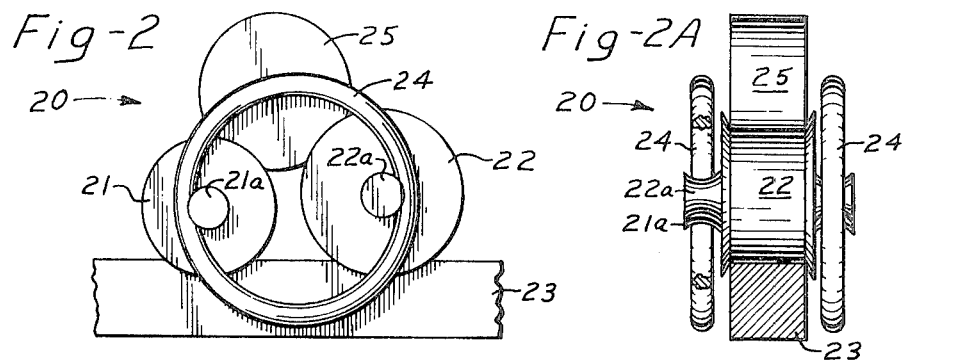
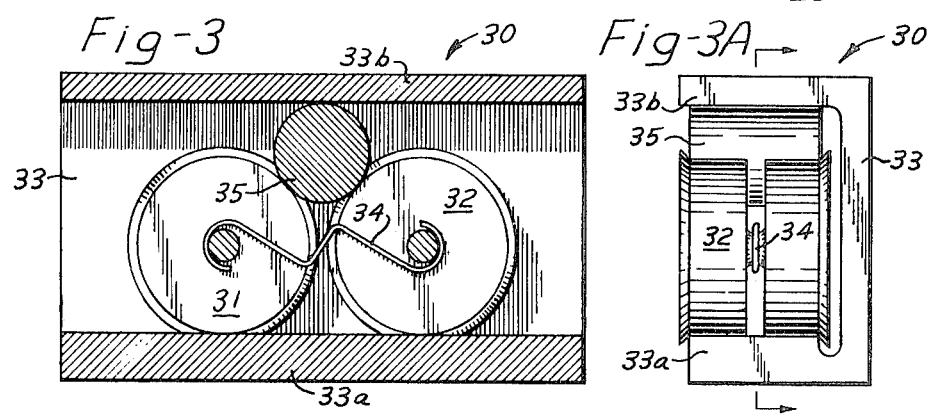
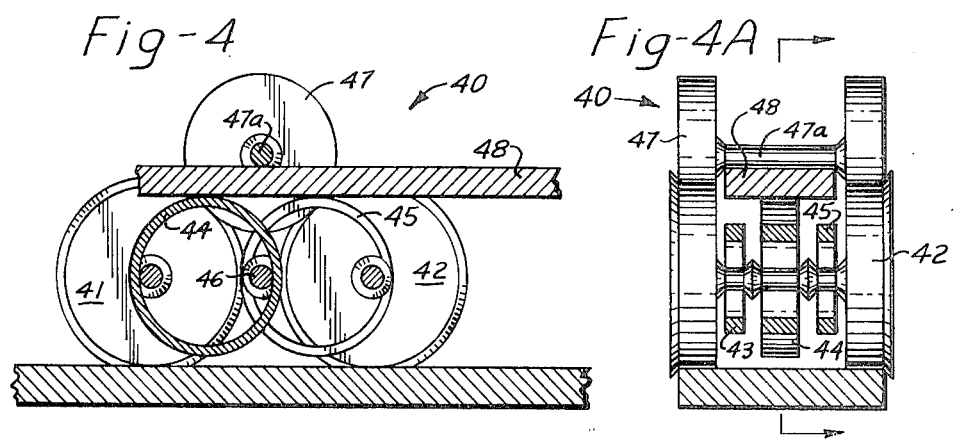

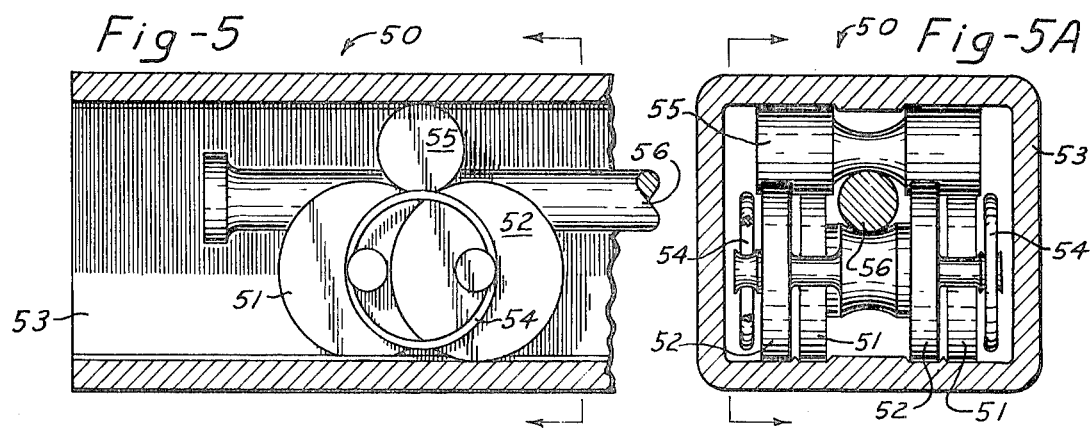
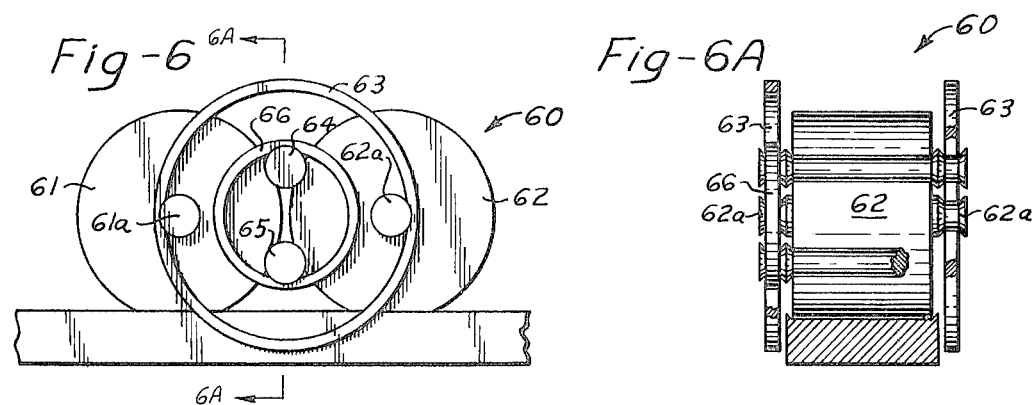
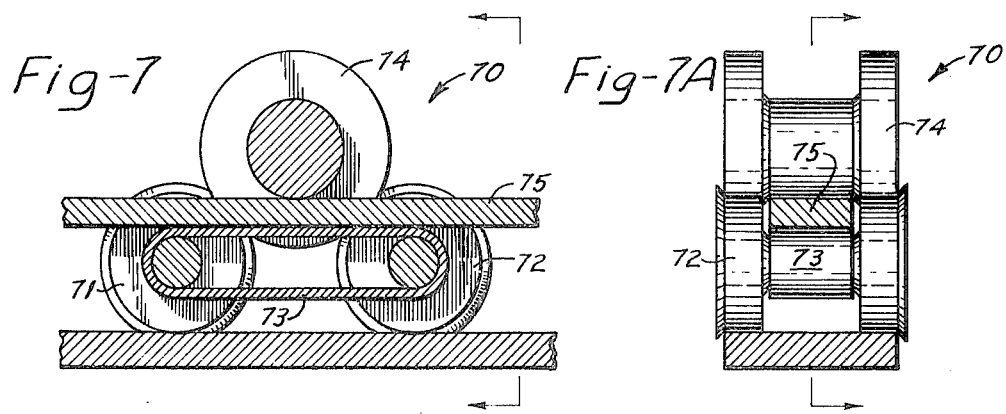
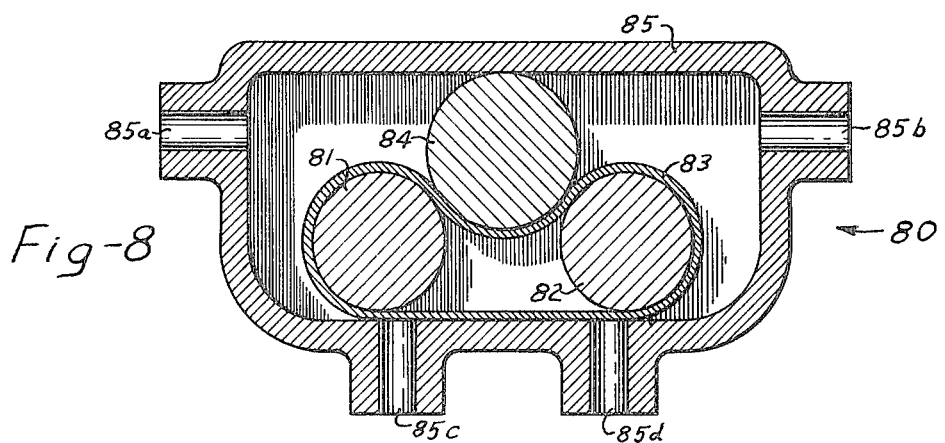

LINEAR ROLLING CONTACT DEVICES

RELATIONSHIP TO PRIOR INVENTIONS

This invention bears a definite relationship to my U.S. Pat. No. 3,937,536 entitled Rolling Contact Bearing Devices, my patent application Ser. No. 511,237 of Oct. 2, 1974 entitled Rolling Contact Bearings U.S. Pat. No. 3,989,324, and my pending patent application Ser. No. 628,350 of Nov. 3, 1975 entitled Rolling Contact Spring Bearings.

BACKGROUND OF THIS INVENTION

1. Field of the Invention

This invention relates to that class of device involving elements which move in a linear direction in rolling contact only.

2. Description of the Prior Art

Most low-friction linear bearings in use today utilize series of captive balls or rollers, or multiple ball bearings to guide elements in linear motion with respect to each other. Such devices include sliding friction between their rotating elements, utilize a multitude of elements, and are excessively complex.

SUMMARY OF THIS INVENTION

This invention relates to a linear rolling contact mechanism, and more particularly to a novel linear bearing in which all elements are in rolling contact only.

All embodiments of this invention include at least two major rotating elements which roll on a linear surface, which are prevented from moving away from each other by one or more retaining elements, and which are prevented from moving towards each other by interposed separating means.

In embodiments where the two major rotating elements are rolers, such rollers may include axial extensions or a central axle; these rollers being prevented from moving apart by one or more retaining rings, belts or springs which surround them, their axial extensions or their axles.

In embodiments where the major rotating elements are rings, a retaining roller is inserted through them to roll on their inner peripheries and prevent them from moving apart with respect to each other.

Whether the major rotating elements are rings or rolers, at least one interposed separating roller in contact with their outer surfaces acts to prevent them from moving towards each other either by gravity, by a stationary element to hold the separating roller in place, or by one or more retaining rings which hold two separating rollers in rolling contact against the major rotating elements.

In most of the embodiments a linear actuator may be introduced between and in rolling contact with the rotating elements so as to move linearly with respect to the linear surface, thus providing a linear bearing having as few as six elements including housing and actuator.

In another embodiment a flexible belt surrounds the two major rollers and is in rolling contact with the interposed roller, all four elements having the same axial dimension and rolling inside a close-fitting rectangular tube. The four elements fill the entire cross-section of the tube, and may be used as a fluid actuated valve, pressure relief valve, or accumulator.

It is therefore a principal object of my invention to provide simple linearly moving mechanisms and bearings in which all elements are in rolling contact only.

It is another object of my invention to provide a linear rolling contact bearing employing as few as six elements including housing and actuator.

It is a further object of my invention to provide a rolling contact linear fluid-actuated valve.

These and other objects, features and advantages will be more apparent from a study of appended drawings in which:

FIG. 1 is a face view of a portion of a rolling contact device of infinite length in which rollers of random diameters contact adjacent rollers and alternate flanges of a retaining U-channel.

FIG. 1A is a cross sectional view taken along lines 1A-1A in FIG. 1.

FIG. 2 is a face view of a rolling contact device similar to FIGS. 1 and 1A but reduced to finite length by using retaining rings to prevent the two major rollers from moving apart.

FIG. 2A is a right end view of FIG. 2 to show how two retaining rings hold the lower rollers in position, one of the retaining rings being partially broken away to show the shape of the axial extensions.

FIG. 3 is a sectional view of a rolling contact device similar to FIGS. 2 and 2A, except that a single retaining spring is used instead of two retaining rings, in accordance with another embodiment of the invention.

FIG. 3A is a right end view of the device of FIG. 3.

FIG. 4 is a cross sectional view of a linear rolling contact bearing similar to that of FIGS. 2 and 2A but using three spool-shaped rollers, three retaining rings, an idler roller and a linear actuator bar.

FIG. 4A is a right end view of FIG. 4 with the retaining rings sectioned in a vertical plane through the idler roller, to show the internal arrangement of rollers and retaining rings.

FIG. 5 is a face view of a linear rolling contact bearing with its housing tube sectioned, similar to FIGS. 4 and 4A but with overlapping spool-shaped rollers, two retaining rings, and a linear actuator rod which rolls between the axles of the spool-shaped rollers.

FIG. 5A is a right end view of FIG. 5 with one of the retaining rings partially broken away to show the internal arrangement of parts.

FIG. 6 is a face view of a linear rolling contact device similar to FIGS. 2 and 2A, but using two rollers with additional retaining rings to prevent the major rollers from moving towards each other.

FIG. 6A is a cross-sectional view of FIG. 6 taken along lines 6A-6A and looking in the direction of the arrows, with one outer retaining ring sectioned, the other outer retaining ring partially broken away, and one inner retaining ring removed to reveal arragement of the elements.

FIG. 7 is a cross-sectional view of a linear rolling contact bearing similar to FIGS. 4 and 4A, but utilizing an endless belt to prevent the major rollers from moving apart, instead of retaining rings, in accordance with another embodiment of the invention.

FIG. 7A is a right end view of FIG. 7 to show the shape of the rollers and the linear actuator.

FIG. 8 is a cross-sectional view of a linear rolling contact fluid valve which utilizes three rollers and an endless belt surrounding the two major rollers, all installed in a housing having a rectangular cross-section, in accordance with another embodiment of the invention.

DETAILED DESCRIPTION

Figure 9:
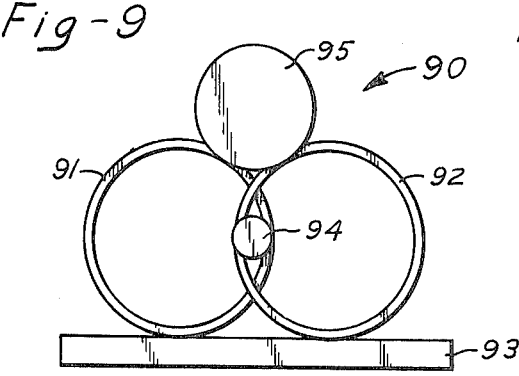
FIG. 9 is a face view of a linear rolling contact device similar to FIGS. 2 and 2A, but in which the major rotating elements comprise three rings having a retainer roller inserted through them to prevent them from moving apart, in accordance with another embodiment of the invention.

FIGS. 1 and 1A illustrate device 10 which is a linear rolling contact device of infinite length, similar to FIGS. 1 and 2 of my patent application Ser. No. 511,237 of Oct. 2, 1974 entitled Rolling Contact Bearings U.S. Pat. No. 3,989,324.

In FIGS. 1 and 1A, U-channel 11 is of infinite length and contains an infinite number of rollers 12 and 13. Each roller 12 is in rolling contact with upper flange 11a of U-channel 11 and with two adjacent rollers 13. Similarly, each roller 13 is in rolling contact with lower flange 11b of U-channel 11 and with two adjacent rollers 12. It will be seen that rollers 12 and 13 may have random diameters, provided that each roller makes the aforementioned three contacts. Note that each roller is held in position by the three elements it contacts, adjacent rollers and linear surface serving as retaining means. It should be further noted that in any group of three adjacent rollers, the middle roller serves as means to prevent the second and third rollers from moving towards each other, yet other rollers serving as means to prevent the second and third rollers from moving away from each other.

Obviously a device having infinite length is mechanically impossible. Thus, the following devices illustrate means of modifying device 10 into rolling contact devices of finite length.

FIGS. 2 and 2A depict device 20 which is a linear rolling contact device similar to that of FIGS. 1 and 2, but which requires only one linear surface and which employs a total of only three rollers. In FIGS. 2 and 2A major rollers 21 and 22 roll on linear rail 23 and comprise the rotating means. Rollers 21 and 22 include flanged ends to prevent their leaving rail 23. Rollers 21 and 22 also include axial extensions 21a and 22a respectively which roll on the inner peripheries of two retaining rings 24. Retaining rings 24 serve as retaining means to prevent rollers 21 and 22 from moving away from each other. Roller 25 is the separating means which prevents rollers 21 and 22 from moving towards each other and is interposed between and in rolling contact with them. The weight of roller 25 serves as retaining means to prevent rollers 21 and 22 from moving towards each other.

It should be noted that just as in device 10, rollers 21 and 22 of device 20 may have random diameters, but their ratios of major diameter to axial extension diameter must be equal to assure rolling contact only with rings 24. Note also that rings 24 could surround rollers 21 and 22 instead of their axial extensions. Also, a single ring 24 surrounding the centers of rollers 21 and 22 would serve to hold them in position.

Device 30 of FIGS. 3 and 3A is similar to FIGS. 2 and 2A except that the two retaining rings 24 are replaced by a single retaining spring or link and a second linear riolling contact surface is provided. In FIGS. 3 and 3A major rollers 31 and 32 are in rolling contact with linear surface 33a of U-channel 33 and are prevented from moving away from each other by retaining spring 34 which hooks onto their reduced-diameter centers. Separating roller 35 and linear surface 33b of U-channel 33 serve as retaining means for preventing rollers 31 and 32 from moving towards each other. The sliding friction between spring 34 and rollers 31 and 32 may be eliminated by utilizing radial load rolling contact bearings such as those described in my U.S. Pat. No. 3,969,005 entitled Rolling Contact Devices.

FIGS. 4 and 4A show linear rolling contact bearing 40 which is similar to device 20, except that different retaining means are used to prevent major rollers from moving apart, and a rolling contact linear actuator is provided.

In FIGS. 4 and 4A spool-shaped major rollers 41 and 42 are limited in the distance they can move apart by retaining rings 43, 44 and 45 and idler roller 46. Idler roller 46 has the same shape as the axles of rollers 41 and 42. The weight of interposed spool-shaped separating roller 47 acts to prevent rollers 41 and 42 from moving towards each other. Linear actuator bar 48 rides in rolling contact atop rings 43, 44 and 45 and is also in rolling contact with axle 47a of roller 47. All elements will be in rolling contact if $(D_1/D_2) \times (R_1/R_2) = (D_3/D_4)$; where $D_1$ is the outer diameter of rollers 41 and 42, $D_2$ being the diameter of their axles; $R_1$ is the outer diameter of rings 43, 44 and 45, $R_2$ being their inner diameter, and; $D_3$ is the outer diameter of roller 47, $D_4$ being the diameter of its axle.

Device 50 of FIGS. 5 and 5A is a linear rolling contact bearing similar to device 40, except that in device 50 only two small retaining rings are used to prevent the two major rollers from moving apart. Major rollers 51 and 52 of FIGS. 5 and 5A roll on the lower inside surface of rectangular tube 53. As can best be seen in FIG. 5A, rollers 51 and 52 are identical, but are reversed with respect to each other so that their roller portions overlap. Thus their axes may be much closer to each other than in devices 20, 30 or 40. In FIGS. 5 and 5A, rings 54 surround axial extensions on the ends of rollers 51 and 52 to prevent them from moving apart. Separating roller 55 is interposed in rolling contact between rollers 51 and 52, also rolling against the upper inside surface of rectangular tube 53.

The axles of rollers 51, 52 and 55 have concave central hubs to accommodate linear actuator rod 56. It will be seen that actuator rod 56 is in rolling contact with the concave central portions of rollers 51, 52 and 55 when the ratio of roller diameter to minimum hub diameter is the same for each. Also, the rollers will travel a much greater distance along U-channel 53 than along rod 56, due to the difference in roller diameters at the contacts. Note too that rollers 51 and 52 may be of different diameters, in which event rod 56 would no longer move parallel to tube 53, but would include a vertical component with its horizontal movement.

FIG. 6 depicts device 60 which is a linear rolling contact device in which the two major spool-shaped rollers 61 and 62 are prevented from moving apart by two outer retaining rings 63 which surround their axial extensions 61a and 62a respectively, as in device 20 and bearing 50.

Returning to FIGS. 6 and 6A, rollers 61 and 62 may have different diameters, but the ratio of the contact diameter of roller 61 to the contact diameter of extensions 61a must equal that of roller 62 to extensions 62a. The separating means for preventing rollers 61 and 62 from moving towards each other is similar to that in FIGS. 1-10 of my U.S. Pat. No. 3,937,536 entitled Rolling Contact Bearing Devices. In FIGS. 6 and 6A it comprises two separating rollers 64 and 65 which are held in position by two inner retaining rings 66. Note that rollers 64 and 65 may be of different diameters. Note also that a single retaining ring 66 rotating in recesses in rollers 61 and 62 could be used in conjunction with the two separating rollers 64 and 65 to prevent rollers 61 and 62 from moving towards each other.

Device 60 becomes a useful mechanism when, for example, a load is carried atop rollers 61 and 62 or when axial extensions 61a and 62a serve as axles to support a load.

FIGS. 7 and 7A show linear rolling contact bearing 70 which is similar to device 40, except that the retainer rings 44 and 45 and spacer roller 46 of device 40 are replaced by a flexible belt. In FIGS. 7 and 7A, spool-shaped major rollers 71 and 72 are prevented from moving away from each other by an endless, flexible belt 73 which surrounds and rolls upon their axles. Rollers 71 and 72 are prevented from moving towards each other by the weight of interposed roller 74. Linear actuator 75 rides on belt 73, and its upper surface is in rolling contact with the axle of spool-shaped roller 74. Note that two flexible belts surrounding rollers 71 and 72 could be used instead of one belt around their axles, in which event actuator 75 would be in rolling contact with the axles of rollers 71, 72 and 74.

In FIG. 8, linear rolling-contact fluid-actuated valve 80 is shown. Major rollers 81 and 82 are prevented from moving away from each other by endless belt 83, and from moving towards each other by separating roller 84. Valve body 85 has a rectangular cross-section which contacts the axial ends of elements 81, 82, 83 and 84 at its sides to prevent fluid leakage therepast. Valve 80 may be used to maintain equal pressure between two separate fluids which are connected to inlets 85a and 85b, as illustrated. If the pressure of fluid at inlets 85a is geater that that at inlet 85b, the assembly of elements 81 through 84 will move to the right, exposing pressure relief port 85c, which will permit fluid to escape, thus tending to equalize pressure at inlets 85a and 85b. If fluid pressure at inlet 85b is greater than at inlet 85a, fluid will similarly escape through port 85d.

In FIG. 8, if inlet 85b and port 85d are blocked off and gas under pressure or a spring is placed in the right side of valve body 85, valve 80 becomes a pressure relief valve. If port 85c is additionally blocked off, an accumulator is described.

Figure 9A:
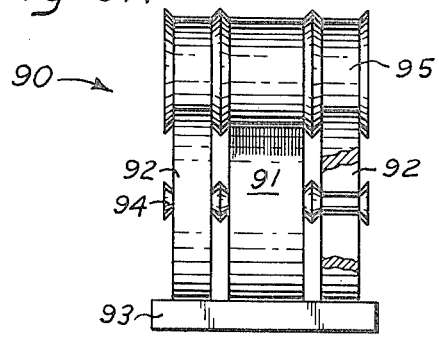
FIG. 9A is a right end view of FIG. 9 with one of the rings partially broken away to show the arrangement and shape of the rollers and rings.

Device 90 of FIGS. 9 and 9A differs from the previously described devices in that the major rotating elements are rings instead of rollers. The means of positioning these rings in rolling contact is similar to that employed in FIGS. 1-8 and 13-14 of my pending patent application Ser. No. 628,350 of Nov. 3, 1975 entitled Rolling Contact Spring Bearings.

In FIGS. 9 and 9A a broad major ring 91 and two narrow rings 92 roll on flat surface 93. Ring 91 is prevented from moving towards the left and rings 92 from moving to the right by retainer roller 94 which is in rolling contact with their inner peripheries. Separating roller 95 is interposed in rolling contact above and between rings 91 and 92, its weight preventing them from moving towards each other. Rollers 94 and 95 include circular ridges to prevent axial movement of rings 91 and 92.

Figure 10:
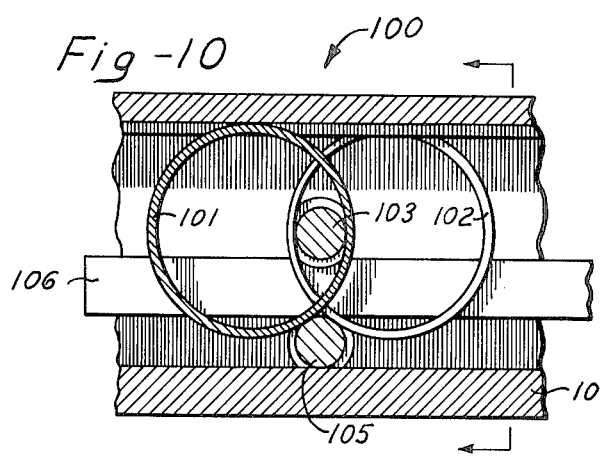
FIG. 10 is a cross-sectional view of a linear rolling contact bearing similar to FIGS. 9 and 9A, but contained in a rectangular tube and including a linear actuator bar in rolling contact with the retainer roller and the separating roller.
Figure 10A:
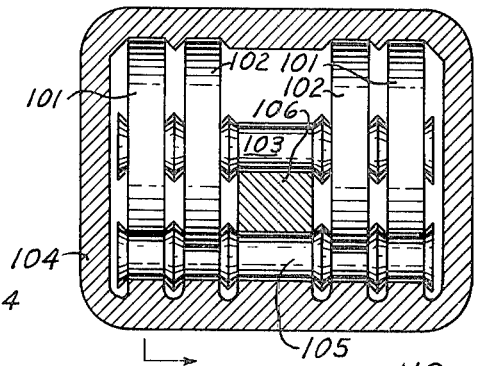
FIG. 10A is a right end view of FIG. 10 to show the internal arrangement of rings, rollers and linear actuator.

FIGS. 10 and 10A show linear rolling contact bearing 100 which is similar to device 90 except that a linear actuator is added and the elements roll inside a rectangular tube. In FIGS. 10 and 10A two major rings 101 are prevented from moving away from two other major rings 102 by retainer roller 103 which rolls on their inner peripheries. Rings 101 and 102 also roll against the upper inner surface of rectangular tube 104, which together with interposed separating roller 105 prevents them from moving towards each other. Roller 105 is in rolling contact also with the lower inner surface of tube 104. Linear actuator 106 rolls between rollers 103 and 105. Rolling-contact-only is assured when the contact diameter of roller 105 equals the contact diameter of roller 103 multiplied by the ratio of outer to inner diameter of rings 101 and 102. lateral movement of rings 101 and 102 is prevented by ridges on rollers 103 and 105, and by ridges and grooves inside tube 104. It should be noted that rings 101 and 102 may be used to provide spring pressure to hold rollers 103 and 105 against linear actuator 106.

Figure 11:
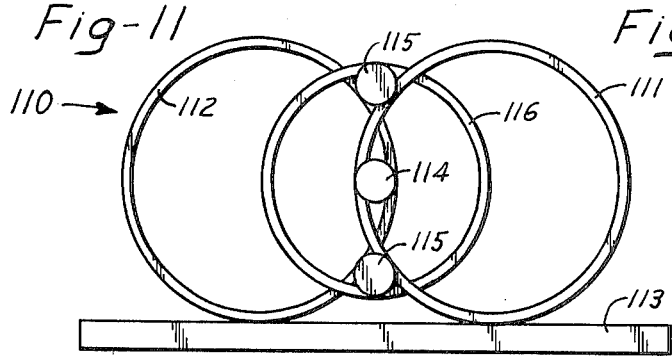
FIG. 11 is a face view of a linear rolling contact device similar to FIGS. 9 and 9A, but which uses two retainer rollers with two retaining rings instead of a single retainer roller.
Figure 11A:
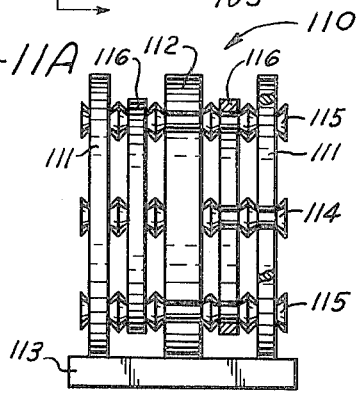
FIG. 11A is a right end view of FIG. 11 with one major ring partially broken away and one retaining ring sectioned to show the shape of the retainer rollers.

In FIGS. 11 and 11A, device 110 is illustrated. It differs from devices 90 and 100 in that two separating rollers and a pair of retaining rings are used to prevent the major rotating rings from moving towards each other. Device 110 is similar to portions of FIGS. 1-8 and 13-14 of my pendng patent application Ser. No. 628,350 of Nov. 3, 1975 entitled Rolling Contact Spring Bearings.

In FIGS. 11 and 11A, a pair of narrow major rings 111 and a third, broad, major ring 112 are in rolling contact with flat surface 113 and are prevent from moving apart by retainer roller 114 which is in rolling contact with their inner peripheries. Two separating rollers 115 are in rolling contact with the outer peripheries of rings 111 and 112, serving to prevent them from moving towards each other, rollers 115 being themselves held in position by two retaining rings 116.

Figure 12:
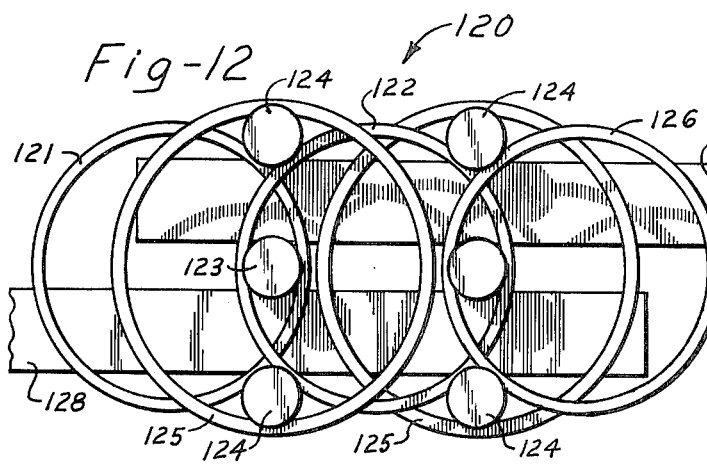
FIG. 12 is a face view of a linear rolling contact bearing similar to FIGS. 11 and 11A but utilizing a greater number of rings and rollers and provided with two linear actuator bars which are held parallel to each other and which move parallel to each other in rolling contact, in accordance with another embodiment of the invention.
Figure 12A:
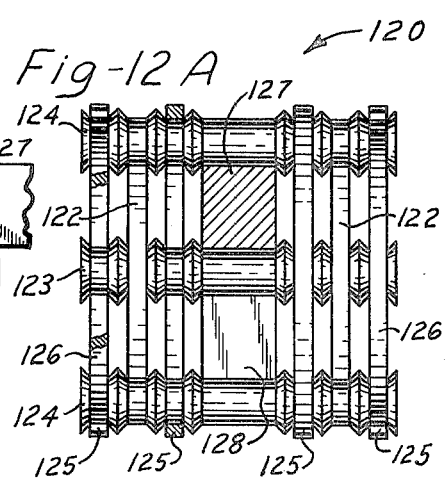
FIG. 12A is a right end view of FIG. 12 with one ring sectioned and another ring partially broken away to reveal the shape of the retainer rollers and the relative positions of the rings.

FIGS. 12 and 12A represent linear rolling contact bearing 120, in which two parallel linear members are held in rolling contact with respect to each other by retaining rings and rollers. Bearing 120 is similar to device 110, except that additional rings and rollers are provided to rigidly support the linear members.

Returning to FIGS. 12 and 12A, two major rings 121 and two major rings 122 are prevented from moving apart by retainer roller 123. Separating rollers 124 and retaining rings 125 prevent major rings 121 and 122 from moving towards each other. Another set of rings 125 and rollers 123 and 124 similarly hold major rings 126 in position with espect to rings 122. Linear bars 127 and 128 are in rolling contact with rollers 123 and 124 as shown, and can only move parallel and in opposite directions with respect to each other.

I claim:

1. A linear rolling contact device comprising:
    at least one linear surface,
    rotating means,
    said rotating means including at least two major rotating elements in rolling contact with said linear surface,
    retaining means,
    said retaining means being in rolling contact with said rotating elements and acting to prevent same from moving away from each other,
    separating means,
    said separating means including at least one roller,
    said separating means being in rolling contact with said rotating elements and acting to prevent same from moving towards each other,
    said retaining means and said separating means not being fastened to said linear surface.

2. The linear rolling contact device as claimed in claim 1 in which said major rotating elements comprise two major rollers.

3. The linear rolling contact device as claimed in claim 2 in which said retaining means comprises at least one retaining ring, said retaining ring being in a surrounding relationship to portions of said two major rollers.

4. The linear rolling contact device as claimed in claim 2 in which said retaining means comprises at least one retaining spring, said retaining spring surrounding portions of said two major rollers.

5. The linear rolling contact device as claimed in claim 2 in which said retaining means comprises at least one endless belt, said belt being in a surrounding relationship to portions of said two major rollers.

6. The linear rolling contact device as claimed in claim 5 in which said separating means is a separating roller, and in which the assembly of said separating rollers, said two major rollers and said belt contacts the inner top, bottom and sides of a close-fitting housing which has a rectangular cross-section, so as to describe a linear rolling-contact fluid-actuated valve.

7. The linear rolling contact device as claimed in claim 1 in which said major rotating elements comprise at least three major rings.

8. The linear rolling contact device as claimed in claim 7 in which said retaining means includes at least one retainer roller, said retainer roller being inserted through said major rings and being in rolling contact with the inner peripheries of same.

9. The linear rolling contact device as claimed in claim 8 in which two linear surfaces are included, said linear surfaces each being linear members which move parallel to each other in rolling contact with said retainer roller and with said separating means.

10. The linear rolling contact device as claimed in claim 1 in which a second linear surface is provided, said second linear surface being affixed parallel to first named linear surface and being in rolling contact with said separating roller.

11. The linear rolling contact device as claimed in claim 1 in which a linear actuator is included, said linear actuator being located between and in rolling contact with said separating roller and said major rotating elements, so as to describe a linear rolling contact bearing.

12. The linear rolling contact device as claimed in claim 1 in which said separating means includes two separating rollers interposed between and in rolling contact with said major rotating elements and at least one retaining ring to hold said separating rollers thereagainst.

* * * * *